(12) United States Patent
Inui et al.

(10) Patent No.: US 6,958,467 B2
(45) Date of Patent: Oct. 25, 2005

(54) CHIRP MEASUREMENT APPARATUS

(75) Inventors: Tetsuro Inui, Yokohama (JP);
Kunihiko Mori, Yokosuka (JP);
Kohichi Robert Tamura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 267 days.

(21) Appl. No.: 10/284,286

(22) Filed: Oct. 31, 2002

(65) Prior Publication Data

US 2003/0086713 A1 May 8, 2003

(30) Foreign Application Priority Data

Nov. 2, 2001 (JP) ........................................ 2001-337865
Jun. 5, 2002 (JP) ........................................ 2002-164437

(51) Int. Cl.$^7$ .............................................. G01N 21/25
(52) U.S. Cl. ................................... 250/227.23; 398/147
(58) Field of Search ................... 250/227.23; 356/73.1; 398/147, 149

(56) References Cited

FOREIGN PATENT DOCUMENTS

EP          0 502 422 A1    9/1992
JP          2001-053679     2/2001

OTHER PUBLICATIONS

Inui et al., "Adaptive dispersion slope equalizer for dispersion–shifted fibers using a nonlinearly chirped fiber Bragg grating pair", Lasers and Electro–Optics, CLEO/Pacific Rim 2001., Jul. 15–19, 2001, pp. 14–15 suppl.*
Marti et al., "On the use of tapered linearly chirped gratings as dispersion–induced distortion equalizers in SCM systems", Journal of Lightwave Technology, Feb. 1997, vol. 15, Issue 2, pp. 179–187.*

M. Tomizawa, et al. "Automatic Dispersion Equalization for Installing High–Speed Optical Transmission System", Journal of Lightwave Technology, vol. 16, Nov. 2, Feb. 1998; pp. 184–191.

Y.O. Noh, et al., "Dispersion Measurement of a Short Length Optical Fiber Using Fourier Transforms Spectroscopy", Lasers and Electro–Optics, 1999; CLEO/Pacific Rim '99; pp. 599–600 (1999).

Tomizawa et al., "Automatic Dispersion Equalization for Installing High–Speed Optical Transmission Systems." Journal of Lightwave Technology, vol. 16, No. 2, Feb. 1998, pp. 184–191.

Inui et al., " Adaptive Dispersion Slope Equalizer Using a Nonlinearly Chirped Fiber Bragg Grating Pair with a Novel Dispersion Detection Technique"; IEEE Photonics Technology Letters, vol. 14, No. 4, Apr. 2002, pp. 549–551.

(Continued)

*Primary Examiner*—Thanh X. Luu
(74) *Attorney, Agent, or Firm*—Dickstein Shapiro Morin & Oshinsky LLP

(57) ABSTRACT

A chirp measurement apparatus includes a splitting section for splitting input signal light to two paths; a first dispersion medium with a total dispersion amount of +D ($\neq$0) at a used wavelength, and a second dispersion medium with a total dispersion amount of −D ($\neq$0) at the used wavelength; first and second nonlinear photo-detecting sections for receiving the signal light beams passing through the first and second dispersion media, and for outputting electric signals with the intensities proportional to nth power of the intensities of the signal light beams, where n is greater than one; and a difference detecting section for computing a difference between the electric signals output from the first and second nonlinear photo-detecting sections, and for outputting a differential signal corresponding to the difference as a chirp signal of the input signal light.

2 Claims, 18 Drawing Sheets

OTHER PUBLICATIONS

Feng et al., " Dynamic Dispersion Compensation in a 10–Gb/s Optical System Using a Novel Voltage Tuned Nonlinearly Chirped Fiber Bragg Grating.", IEEE Photonics Technology Letters, vol. 11, No. 3, Mar. 1999, pp. 373–375.

Ishikawa et al., "Demonstration of Automatic Dispersion Equalization in 40 Gbit/s OTDM Transmission.", ECOC'98, Sep. 20–24, 1998, Madrid, Spain, pp. 519–520.

Ooi et al., "40–Gbit/s × 32 ch Automatic Dispersion Compensation with VIPA Variable Dispersion Compensators.", OECC 2001, PD5 (2001).

Sano et al., Adaptive Dispersion Equalization of 8–ps Pulses in 400–km Transmission Line by Monitoring Relative Phase Shift Between Spacing–Fixed WDM Signals. , OFC'99, WJ4–1–WJ4–3, pp. 165–167. (1999).

* cited by examiner

CHIRP MEASUREMENT APPARATUS

This application is based on Japanese Patent Application No. 2001-337865 filed Nov. 2, 2001 and No. 2002-164437 filed Jun. 5, 2002, the content of which are incorporated hereinto by reference.

BACKGROUND OF THE INVENTION

1. Field of the Invention

The present invention relates to a chirp measurement apparatus and its application for detecting wavelength dispersion and its fluctuations in an optical fiber in a terminal or in a linear repeater and regenerator of a ultrafast, large capacity optical communication system. In addition, the present invention relates to a chirp measurement method for carrying out calibration using input signal light unaffected by the wavelength dispersion of the optical fiber.

2. Description of the Related Art

Optical fiber transmission lines have dispersion fluctuations due to environmental changes such temperature variations and pressure application. Accordingly, it is necessary for ultrafast large capacity optical communication systems to employ an adaptive dispersion equalization technique for automatically detecting the dispersion fluctuations of the optical fiber transmission lines to carry out equalization. As conventional chirp measurement methods for automatically detecting the dispersion fluctuations, the following methods are known.

An adaptive dispersion equalization scheme utilizing a wavelength tunable laser: It monitors the intensity of a 40 GHz electric clock, and dithers the wavelength of the signal light to set it at the optimum wavelength (G. Ishikawa et al., ECOC'98, p.519, 1998). It has a problem in that the wavelength of the signal light varies.

An adaptive dispersion equalization scheme utilizing a VIPA (Virtually Imaged Phased Array) tunable dispersion equalizer: It employs a method of dithering the dispersion of an equalizer to detect the fluctuations in the dispersion (H. Ooi et al., OECC'2001, PD5, 2001). It dithers the dispersion value in a range of ±3 ps/nm, and has a problem in that it cannot avoid characteristic degradation in the long run because it includes an movable optical section.

An adaptive dispersion equalizer using a fiber grating: It employs a method of detecting the dispersion fluctuations in a single mode fiber transmission line by PM-AM conversion (K. M. Feng et al., IEEE Photon. Technol. Lett., vol.11, no.3, p.373, 1999). The single mode fiber always has anomalous dispersion in 1.5 μm band, and can utilize the PM-AM conversion because the sign of the dispersion is invariant against the environmental change. However, as for a dispersion shift fiber transmission line, the sign of the dispersion of which varies, a monitor signal is required besides a main signal (M. Tomizawa et al., J. Lightwave Technol., vol.16, no.2, p.184, 1998).

There is another method that detects the dispersion fluctuations by measuring the relative phase shift amount between two channels of the WDM signal (A. Sano et al, OFC'99, WJ4, p.165, 1999). This method has a problem of requiring a monitor signal in addition to the main signal.

Furthermore, a configuration as shown in FIG. 1 is known (Japanese Patent Application Laid-open No. 2001-053679, and T. Inui et. al., IEEE PHOTONICS TECHNOLOGY LETTERS, Vol.14, No.4, April 2002). It splits the signal light affected by the dispersion fluctuations through an optical fiber transmission line into two portions, supplies them to optical fibers which are arranged in two paths and have the dispersion values having the same absolute value and different sign, and detects the dispersion fluctuations from the difference between the levels of the clock signals of the two signal light beams passing through the two paths.

In FIG. 1, a first optical coupler divides part of the signal light from the optical fiber transmission line, and a second optical coupler splits it to two portions to a path 1 and path 2. An optical fiber with positive dispersion (+D ps/nm) is disposed as the path 1, and an optical fiber with negative dispersion (−D ps/nm) is disposed as the path 2. The signal light beams passing through the optical fibers constituting the two paths are each converted into an electric signal by a photodiode (PD), and supplied to an RF detector for detecting the level of the clock signal via a bandpass filter (BPF). The levels of the clock signals of the two paths are compared by a differential amplifier, which outputs a differential signal.

The optical fiber transmission line has dispersion fluctuations due to environmental changes, and the dispersion fluctuations make the level of the clock signal (output voltage) of one of the two paths greater than that of the other path as illustrated in FIG. 2A. In this case, controlling a tunable dispersion equalizer (not shown) inserted into the optical fiber transmission line can minimize the differential signal so that the levels of the clock signals of the two paths become equal as illustrated in FIG. 2B, thereby being able to equalize the dispersion fluctuations at high accuracy.

Thus, the conventional configuration as shown in FIG. 1 can detect the dispersion fluctuations with the fluctuation direction of the dispersion of the optical fiber transmission line by using the differential signal between the levels of the clock signals of the two paths. Accordingly, it is applicable to various types of optical fiber transmission lines.

However, the chirp measurement apparatus with the conventional configuration must determine the passband of its clock extraction circuit (bandpass filter and RF detector) in accordance with the bit rate of the transmission system. This is because it establishes synchronization by extracting the clock signal. As a result, a new problem arises that it is difficult for the conventional system to flexibly cope with considerable changes in the bit rate of the optical signal to be measured.

SUMMARY OF THE INVENTION

It is therefore an object of the present invention to provide a chirp measurement apparatus and a chirp measurement method capable of detecting the dispersion fluctuations of the optical fiber transmission line independently of the transmission optical fiber or bit rate, or without dithering the wavelength of the signal light or the dispersion of the tunable dispersion equalizer, or without using other monitor light, or without extracting the clock signal, by utilizing the property that when the average optical power is constant of the input light to the nonlinear photo-detector such as a two-photon absorption device, the average output of the nonlinear photo-detector increases as the pulse width narrows.

The central features the present invention are summarized as follows.

According to a first aspect of the present invention, there is provided a chirp measurement apparatus comprising: splitting means for splitting input signal light to two paths; a first dispersion medium with a total dispersion amount of +D (≠0) at a wavelength of the input signal light, and first nonlinear photo-detecting means for receiving the signal light passing through the first dispersion medium, and for outputting an electric signal with the intensity proportional to nth power of the intensity of the signal light, where n is greater than one, the first dispersion medium and the first nonlinear photo-detecting means being placed on a first path of the two paths; a second dispersion medium with a total dispersion amount of −D (≠0) at the wavelength of the input signal light, and second nonlinear photo-detecting means for receiving the signal light passing through the second dispersion medium, and for outputting an electric signal with the intensity proportional to nth power of the intensity of the signal light, where n is greater than one, the second dispersion medium and the second nonlinear photo-detecting means being placed on a second path of the two paths; and difference detecting means for obtaining a difference between the electric signals output from the first nonlinear photo-detecting means and the second nonlinear photo-detecting means, and for outputting a differential signal corresponding to the difference as a chirp signal of the input signal light.

According to a second aspect of the present invention, there is provided a chirp measurement apparatus comprising: splitting means for splitting input signal light to two paths; a first dispersion medium with a total dispersion amount of +D (≠0) at the wavelength of the input signal light, and first polarization beam splitting means for splitting the signal light into polarized waves orthogonal to each other, the first dispersion medium and the first polarization beam splitting means being placed in a first path of the two paths; a second dispersion medium with a total dispersion amount of −D (≠0) at the wavelength of the input signal light, and second polarization beam splitting means for splitting the signal light into polarized waves orthogonal to each other, the second dispersion medium and the second polarization beam splitting means being placed in a second path of the two paths; a first pair of nonlinear photo-detecting means for receiving the polarized waves split by the first polarization beam splitting means, and for outputting electric signals with intensities proportional to nth power of the optical intensities of the polarized waves, where n is an integer greater than one; a second pair of nonlinear photo-detecting means for receiving the polarized waves split by the second polarization beam splitting means, and for outputting electric signals with intensities proportional to nth power of the optical intensities of the polarized waves, where n is an integer greater than one; and processing means for computing chirp of the input signal light from the electric signals output from the first pair and second pair of the nonlinear photo-detecting means, and for outputting it as a chirp signal.

According to a third aspect of the present invention, there is provided a chirp measurement apparatus comprising: a dispersion medium with a total dispersion amount of +D (≠0) at the wavelength of the input signal light; and nonlinear photo-detecting means for receiving signal light passing through the dispersion medium, for outputting an electric signal with intensity proportional to nth power of the optical intensity of the signal light, and for outputting the electric signal as a chirp signal of the input signal light.

According to a fourth aspect of the present invention, there is provided a chirp measurement method comprising: a first step of splitting input signal light to two paths; a second step of supplying signal light beams traveling through the two paths to first and second nonlinear photo-detecting means through first and second dispersion media with total dispersion amounts of +D (≠0) and −D (≠0) at the wavelength of the input signal light beams, respectively, to convert the individual signal light beams traveling through the two paths to electric signals with intensities proportional to nth power of input optical intensities, where n is greater than one; and a third step of outputting a differential signal corresponding to a difference between the electric signals of the two paths as a chirp signal of the input signal light.

According to a fifth aspect of the present invention, there is provided a dispersion compensating apparatus comprising the chirp measurement apparatus in accordance with the present invention, and tunable dispersion equalization means for canceling the chirp of the input signal light measured by the chirp measurement apparatus.

The chirp measurement apparatus and chirp measurement method in accordance with the present invention described above can detect the dispersion fluctuations in the optical fiber transmission line independently of the transmission optical fiber and bit rate, and without dithering the wavelength of the signal light or the dispersion of the tunable dispersion equalizer, or without using other monitoring light, or without extracting the clock signal. In particular, the configuration using the differential signal can detect the dispersion fluctuations in the optical fiber transmission line with the sign of the fluctuations. In addition, being independent of the bit rate, the chirp measurement apparatus in accordance with the present invention is applicable to the adaptive dispersion equalization of optical transmission systems with various bit rates, making it possible to reduce the number of components and the size and cost of the systems.

Furthermore, the dispersion compensating apparatus in accordance with the present invention is configured such that it utilizes the chirp measurement apparatus in accordance with the present invention to measure the chirp of the optical signal output from the optical fiber transmission line, and controls the tunable dispersion equalizer to cancel out the chirp. Accordingly, it is independent of the bit rate of the transmission system to which it is applied, making it possible to apply it to 10 Gbit/s to 40 Gbit/s optical transmission systems and further to 160 Gbit/s optical transmission systems.

The above and other objects, effects, features and advantages of the present invention will become more apparent from the following description of embodiments thereof taken in conjunction with the accompanying drawings.

BRIEF DESCRIPTION OF THE DRAWINGS

FIGS. 2A and 2B are diagrams illustrating the variations in the output voltages of the two paths when carrying out the adaptive dispersion equalization, wherein FIG. 2A illustrates the output voltages before the adaptive equalization, and FIG. 2B illustrates them after the adaptive equalization;

DETAILED DESCRIPTION OF PREFERRED EMBODIMENTS

The embodiments in accordance with the present invention will now be described with reference to the accompanying drawings.

Figure 3:
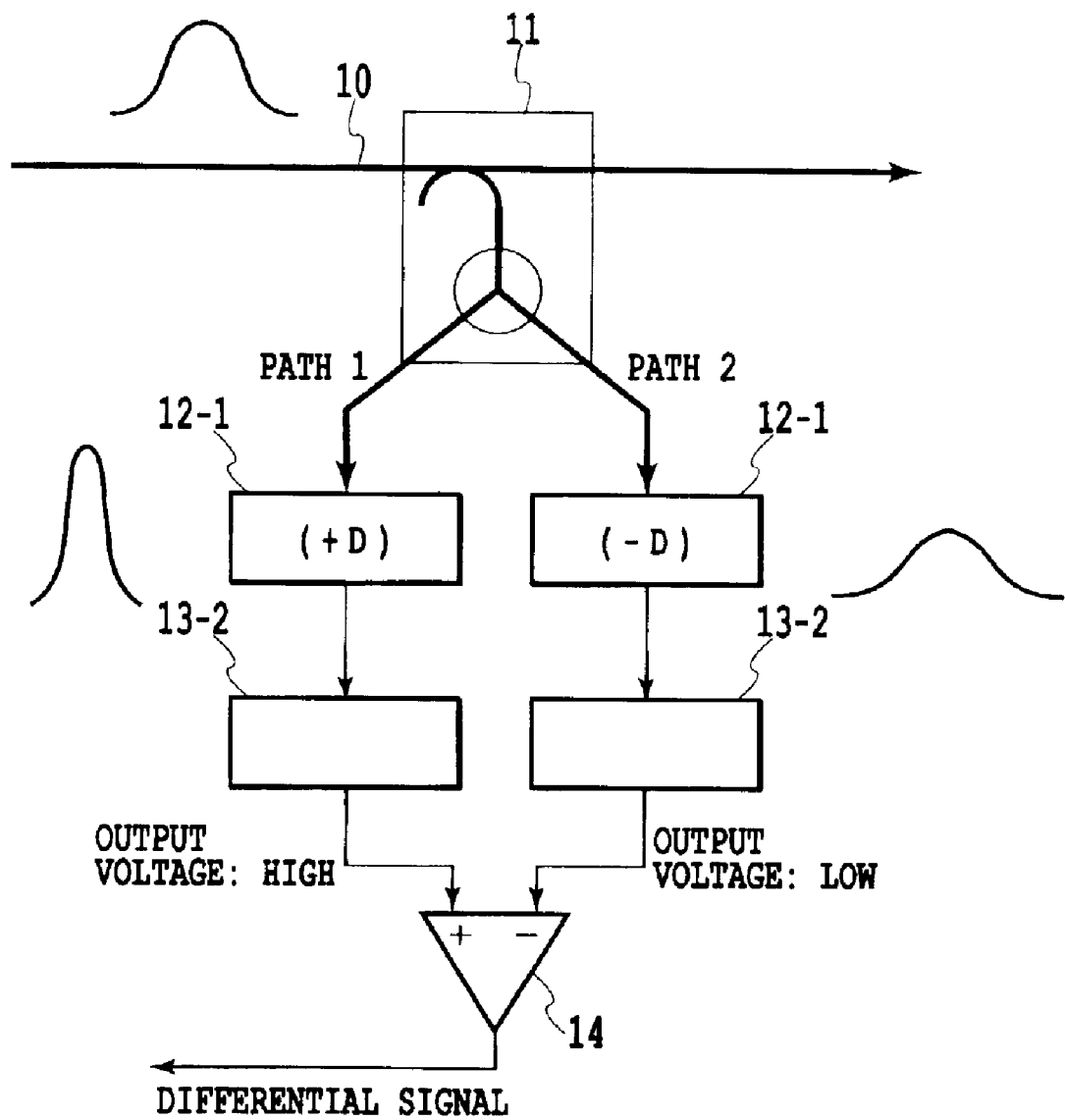
FIG. 3 is a block diagram showing a basic configuration of a chirp measurement apparatus in accordance with the present invention.

FIG. 3 is a block diagram showing a basic configuration of a chirp measurement apparatus in accordance with the present invention. The chirp measurement apparatus in accordance with the present invention utilizes the property that when the average optical power is constant of the input light to the nonlinear photo-detector such as a two-photon absorption device, the average output of the nonlinear photo-detector increases as the pulse width narrows.

In FIG. 3, a splitting section 11 divides part of the signal light (input signal light) traveling through an optical fiber transmission line 10, a transmission line of the input signal light, and further splits it into two paths. FIG. 3 illustrates the case where the splitting section 11 splits the signal light into two equal parts in terms of power. A first path of the two paths is provided with a dispersion medium 12-1 and a nonlinear photo-detector 13-1. The dispersion medium 12-1 has a total dispersion amount of +D ($\neq 0$) at the used wavelength. The nonlinear photo-detector 13-1 outputs an electric signal (voltage) with the intensity proportional to the nth power of the optical intensity of the signal light passing through the dispersion medium, where n is greater than one. Likewise, a second path of the two paths is provided with a dispersion medium 12-2 and a nonlinear photo-detector 13-2. The dispersion medium 12-2 has a total dispersion amount of −D ($\neq 0$) at the used wavelength. The nonlinear photo-detector 13-2 outputs an electric signal (voltage) with the intensity proportional to the nth power of the optical intensity of the signal light passing through the dispersion medium, where n is greater than one.

When the input signal light passing through the optical fiber transmission line 10 undergoes the dispersion (that is, when the chirp is present), the pulse width of the first path (path 1 of FIG. 3) narrows and that of the second path (path 2 of FIG. 3) broaden because of the dispersion media 12-1 and 12-2. In other words, the peak power of the first path increases and that of the second path decreases. The nonlinear photo-detectors 13-1 and 13-2 output electric signals (voltages) corresponding to the peak powers. For example, assume that the nonlinear photo-detectors each output an electric signal proportional to the square of the optical intensity, that the signal light pulse is a Gaussian pulse with average power E and with linear chirp, that the chirp parameter is C, and the bandwidth of the signal light is $\Delta\omega$, and that the product of the second order derivative of the propagation constant $\beta$ and the length of the dispersion medium is $B_2$, then the output voltage $V(C, \Delta\omega, B_2)$ is given by the following expression.

$$V(C, \Delta\omega, B_2) \sim E^2[(1+C^2)/\{(1+B_2\Delta\omega^2 C+C^2)^2+(B_2\Delta\omega^2)^2\}]^{1/2}$$

When the input signal light pulse is chirping under the influence of the dispersion, the pulse width narrows on the first path and hence its peak power increases. Thus, the output voltage of the nonlinear photo-detector 13-1 of the first path increases, whereas that of the nonlinear photo-detector 13-2 of the second path decreases. A difference detector 14 detects the difference (voltage difference) between the electric signals output from the nonlinear photo-detectors 13-1 and 13-2 of the two paths.

Figure 4:
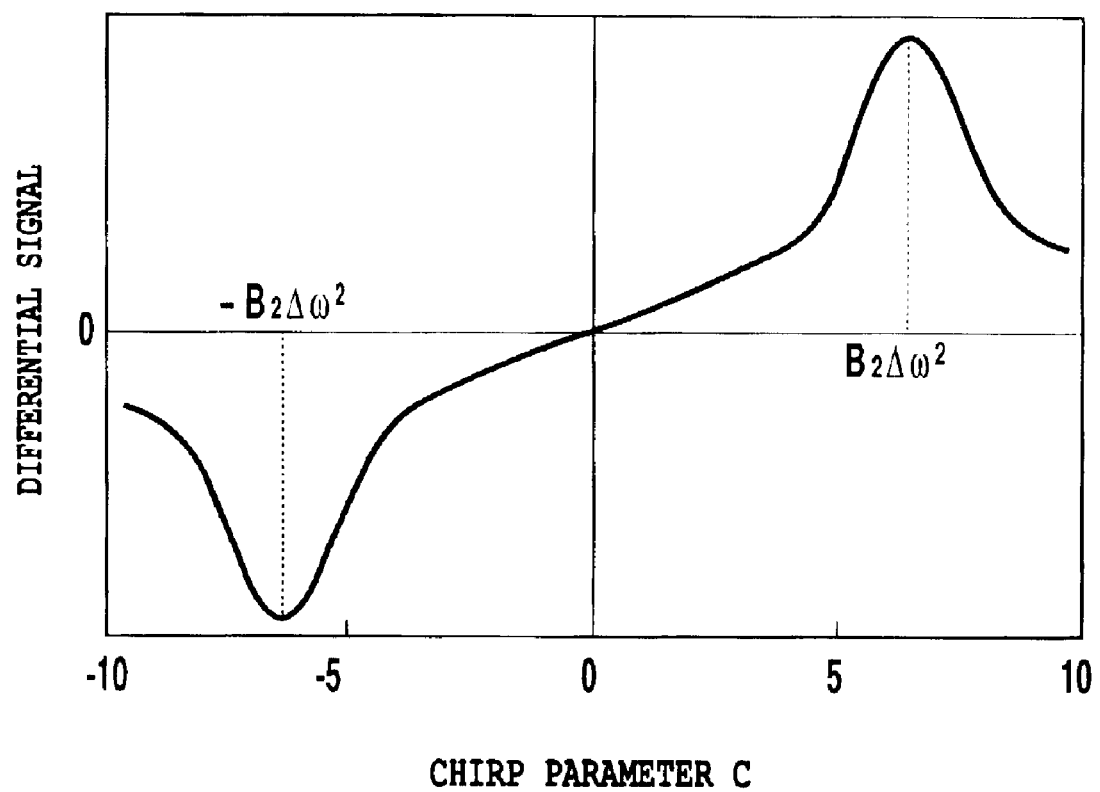
FIG. 4 is a graph illustrating calculation results of a differential signal.

FIG. 4 is a graph illustrating the calculation results of the differential signal ($V(C, \Delta\omega, -B_2)-V(C, \Delta\omega, B_2)$). As illustrated in FIG. 4, the voltage difference varies monotonically in the range from $-B_2\Delta\omega^2$ to $B_2\Delta\omega^2$, and linearly around C=0. Accordingly, the differential signal can be used as the dispersion detection signal of the optical fiber transmission line.

As the nonlinear photo-detectors 13-1 and 13-2, a nonlinear photo-detecting device with two-photon absorption can be used. Alternatively, it is possible to use a nonlinear medium generating second harmonic light of the input light and a photo-detector for converting the second harmonic light into an electric signal. In addition, a filter that passes only the second harmonic light can be interposed between the nonlinear medium and photo-detector.

When the input signal light untouched by the dispersion is input, the dispersion media 12-1 and 12-2 do not cause any difference between the output peak powers so that the differential signal is nearly zero. In other words, as long as the signal light is affected by the dispersion, the differential signal is generated and the chirp detection is carried out.

Consider the case where the splitting ratio of the splitting section 11 is not 1:1, or where even if the splitting ratio is 1:1, the losses of the two paths after the splitting differ. In such cases, even if the input signal light unaffected by the dispersion is supplied, the intensities of the electric signals supplied from the two paths to the difference detector are unequal, and hence the differential signal is generated. In this case, to match the intensities of the electric signals supplied from the two paths to the difference detector when the input signal light unaffected by the dispersion of the optical fiber transmission line is input, it is possible to implement such a configuration that comprises an optical signal adjusting section for regulating the optical signal intensities supplied to the nonlinear photo-detectors of the two paths, or an electric signal adjusting section for regulating the intensities of the electric signals output from nonlinear photo-detectors of the two paths. This makes it possible to compensate for the splitting ratio or the difference between the losses of the two paths in advance, thereby enabling producing the differential signal corresponding to the dispersion optical fiber transmission line accurately.

It is also possible to implement such a configuration that feeds differential signal supplied from the difference detector back to at least one of the optical signal adjusting sections, or at least one of the electric signal adjusting sections the two paths comprise, and that regulates the differential signal to become minimum when the input signal light unaffected by the dispersion of the optical fiber transmission line is input.

Alternatively, it is possible to implement such a configuration that comprises a coupler for dividing part of the input signal light supplied to the splitting section, a linear photo-detector for outputting an electric signal $V_1$ proportional to its optical intensity, and normalization sections for normalizing electric signals $V_{21}$ and $V_{22}$ output from the nonlinear photo-detectors of the two paths to electric signals $V_{21}/V_1^n$ and $V_{22}/V_1^n$ by the electric signal $V_1$, and for supplying them to the difference detector.

Likewise, it is possible to implement such a configuration that comprises couplers for dividing parts of the signal light beams input to the nonlinear photo-detectors, linear photo-detectors for outputting electric signals $V_{11}$ and $V_{21}$ proportional to their optical intensities, and normalization sections for normalizing the electric signals $V_{21}$ and $V_{22}$ output from the nonlinear photo-detectors of the two paths to electric signals $V_{21}/V_{11}^n$ and $V_{22}/V_{12}^n$ by the electric signals $V_{21}$ and $V_{22}$, and for supplying them to the difference detector.

It is also possible to implement such a configuration that comprises a dispersion medium with the total dispersion amount +D ($\ne$0) at the used wavelength, and a nonlinear photo-detector for receiving signal light passing through the dispersion medium and for outputting the electric signal with the intensity proportional to the nth power of the optical intensity, where n is greater than one, wherein the electric signal is output as the dispersion detection signal of the optical fiber transmission line. In this case, it is also possible to add a coupler for dividing part of the signal light to be supplied to the nonlinear photo-detector, a linear photo-detector for producing an electric signal $V_1$ with the intensity proportional to the optical intensity, and a normalization section for normalizing the electric signal $V_2$ output from the nonlinear photo-detector to an electric signal $V_2/V_1^n$ by the electric signal $V_1$.

Next, embodiments in accordance with the present invention will be described.

(First Embodiment)

Figure 5:
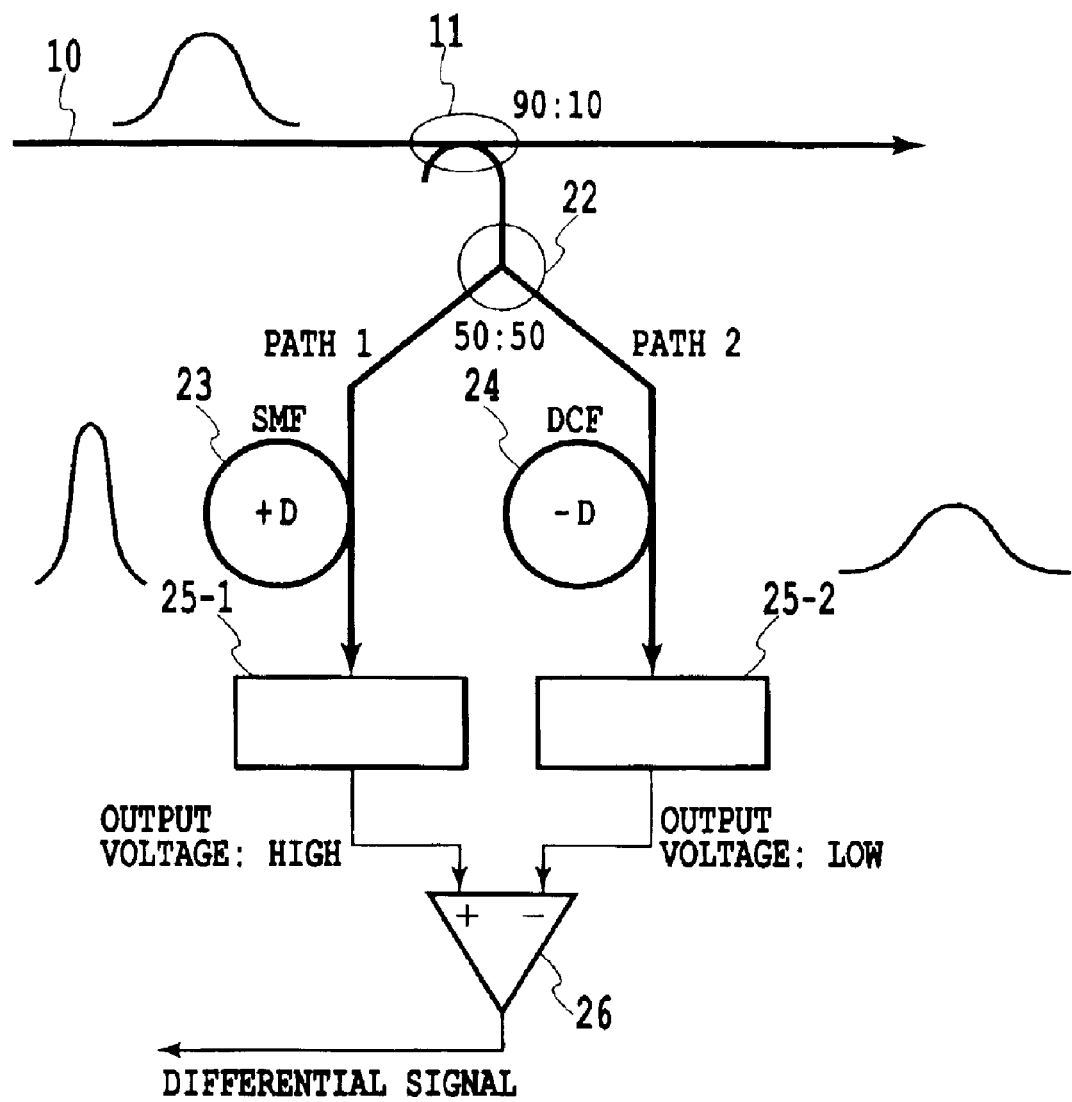
FIG. 5 is a block diagram showing a first configuration of the chirp measurement apparatus in accordance with the present invention.

FIG. 5 is a block diagram showing a first configuration of the chirp measurement apparatus in accordance with the present invention. In FIG. 5, the input signal light traveling through the optical fiber transmission line 10 undergoes 1/10 power division by a 90:10 optical coupler 21, followed by further splitting the signal light to two paths by a 50:50 optical coupler 22 that divides it to two portions with equal power. A first path (path 1) of the two paths is provided with a single mode fiber (SMF) 23 with the total dispersion amount +D ($\ne$0) at the used wavelength as a dispersion medium, and the second path (path 2) is provided a dispersion compensating fiber (DCF) 24 with the total dispersion amount −D ($\ne$0) at the used wavelength as a dispersion medium.

In addition, the two paths are provided with Si-APDs (Silicon Avalanche Photo Diodes) 25-1 and 25-2 that exhibit two-photon absorption in a 1.5 $\mu$m band as nonlinear photo-detectors for receiving the signal light beams passing through the individual dispersion media 23 and 24, and for outputting electric signals with the intensities proportional to the square of the intensity of the input light beams. Their response frequency is much lower than the transmission rate so that they can produce a DC voltage as their output. A differential amplifier 26 detects the difference between the output voltages of the Si-APDs 25-1 and 25-2 of the two paths, and outputs the differential signal (voltage difference).

Figure 6:
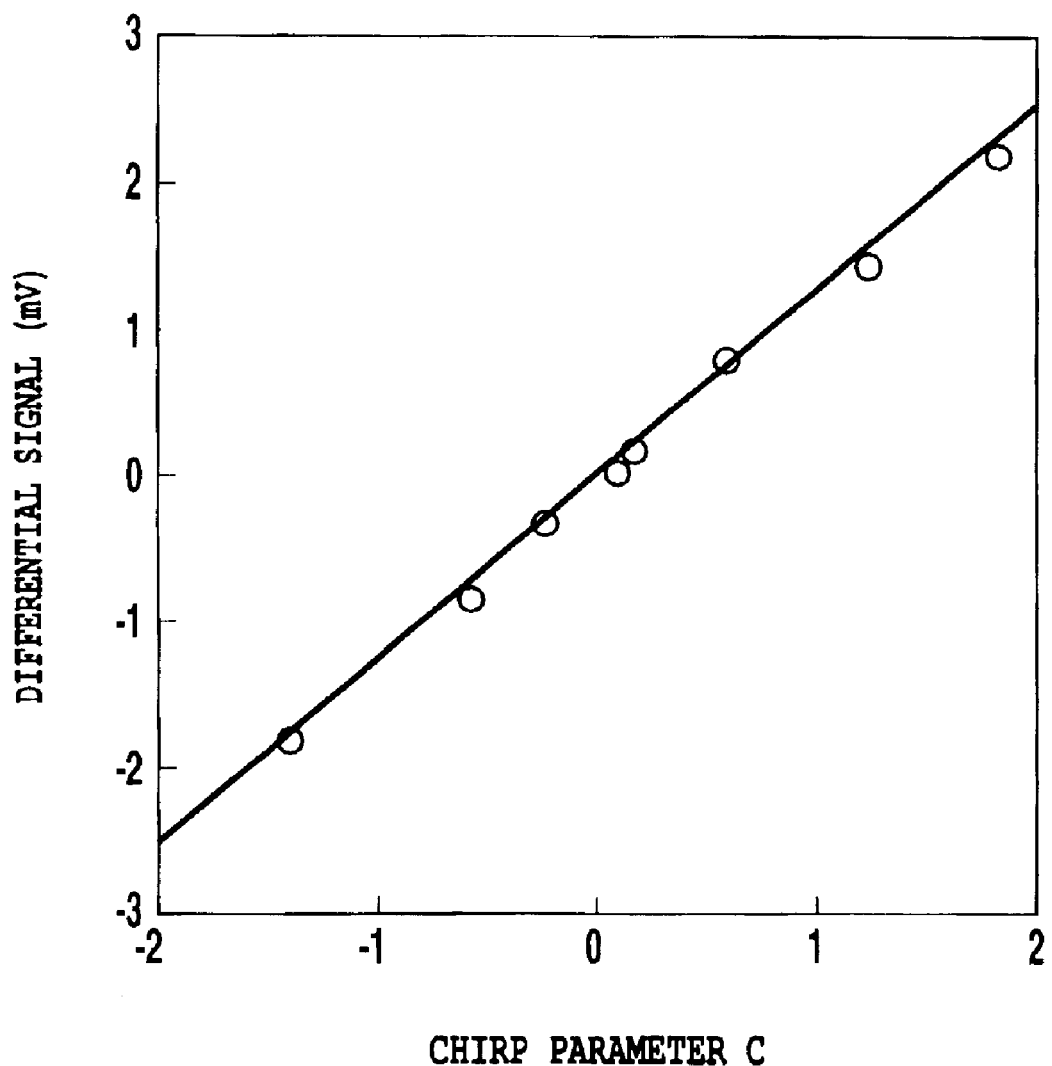
FIG. 6 is a graph illustrating the output voltage of the differential amplifier versus a measured chirp parameter.

FIG. 6 is a graph illustrating the output voltage of the differential amplifier 26 versus a measured chirp parameter. The Si-APDs have the response frequency of 10 MHz against the transmission rate of 10 Gbit/s. In addition, as for the dispersion media, the single mode fiber has the dispersion value of +16 ps/nm at the wavelength 1552 nm, and the dispersion compensating fiber has the dispersion value of −16 ps/nm at the same wavelength. The signal light is an optical pulse with a bandwidth of 545 GHz fed from a 10 GHz mode-locked fiber laser. The output voltage exhibits a linear characteristic for the chirp parameter, which is consistent with the theoretical calculation result of the differential signal as illustrated in FIG. 4. In other words, since the output voltage of the differential amplifier 26 takes the values corresponding to the magnitude of the dispersion (chirp), it can be used as the chirp detection signal of the optical pulse traveling through the optical fiber transmission line 10.

(Second Embodiment)

Figure 7:
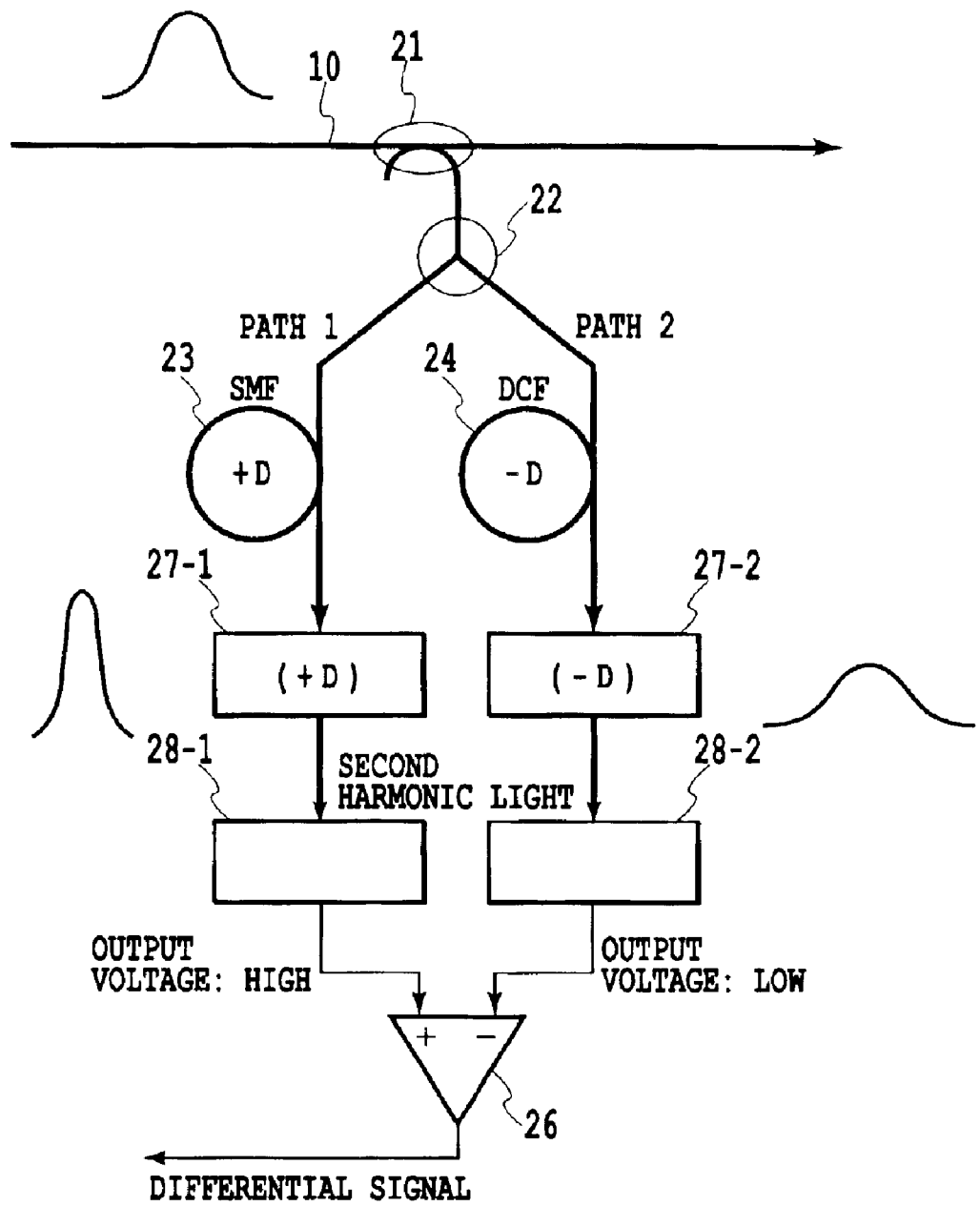
FIG. 7 is a block diagram showing a second configuration of the chirp measurement apparatus in accordance with the present invention.

FIG. 7 is a block diagram showing a second configuration of the chirp measurement apparatus in accordance with the present invention. The second configuration is characterized in that it employs $KH_2PO_4$ (KDPs) 27-1 and 27-2, an SHG (second harmonic generation) crystal, as the nonlinear media for generating the second harmonic light of the input light in place of the Si-APDs used as the nonlinear photo-detectors in the first configuration, and employs photomultipliers 28-1 and 28-2 as the photo-detectors for converting the second harmonic light to electric signals.

The light beams output from the single mode fiber (SMF) 23 and dispersion compensating fiber (DCF) 24 are incident onto the KDPs 27-1 and 27-2 via focusing lenses not shown. The KDPs 27-1 and 27-2 generate the second harmonic light beams with the output intensity proportional to the square of the input optical intensity. The second harmonic light beams (700 nm wavelength band) are incident onto the photomultipliers 28-1 and 28-2 with a sensitive wavelength range of 300–820 nm. When the signal light fed from the optical fiber transmission line 10 undergoes the dispersion, the output voltages of the photomultipliers 28-1 and 28-2 of the two paths differ, so that the magnitude of the dispersion (chirp) can be detected by the voltage difference.

(Third Embodiment)

It is possible for the first and second configurations to utilize a tunable dispersion equalizer such as a fiber Bragg grating or VIPA in place of the single mode fiber (SMF) 23 and dispersion compensating fiber (DCF) 24 used as the dispersion media disposed in the two paths. To achieve the positive and negative dispersion values with the same absolute value, it is enough to use the same chirped fiber Bragg gratings, and to make opposite the incident direction of the light.

Alternatively, it is also possible to adjust the dispersion values of the chirped fiber Bragg gratings by a piezoelectric transducer or heater in order to set the dispersion values +D ($\ne$0) and −D ($\ne$0) of the two paths.

(Fourth Embodiment)

In the second configuration, it is possible to interpose bandpass optical filters, which pass only the second harmonic light with a frequency $2\omega_1$, into the paths from the KDPs 27-1 and 27-2, which receive the signal light with a frequency $\omega_1$ and generate the second harmonic light with the frequency $2\omega_1$, to the photomultipliers 28-1 and 28-2. This makes it possible to eliminate noise other than the second harmonic light.

(Fifth Embodiment)

Figure 8:
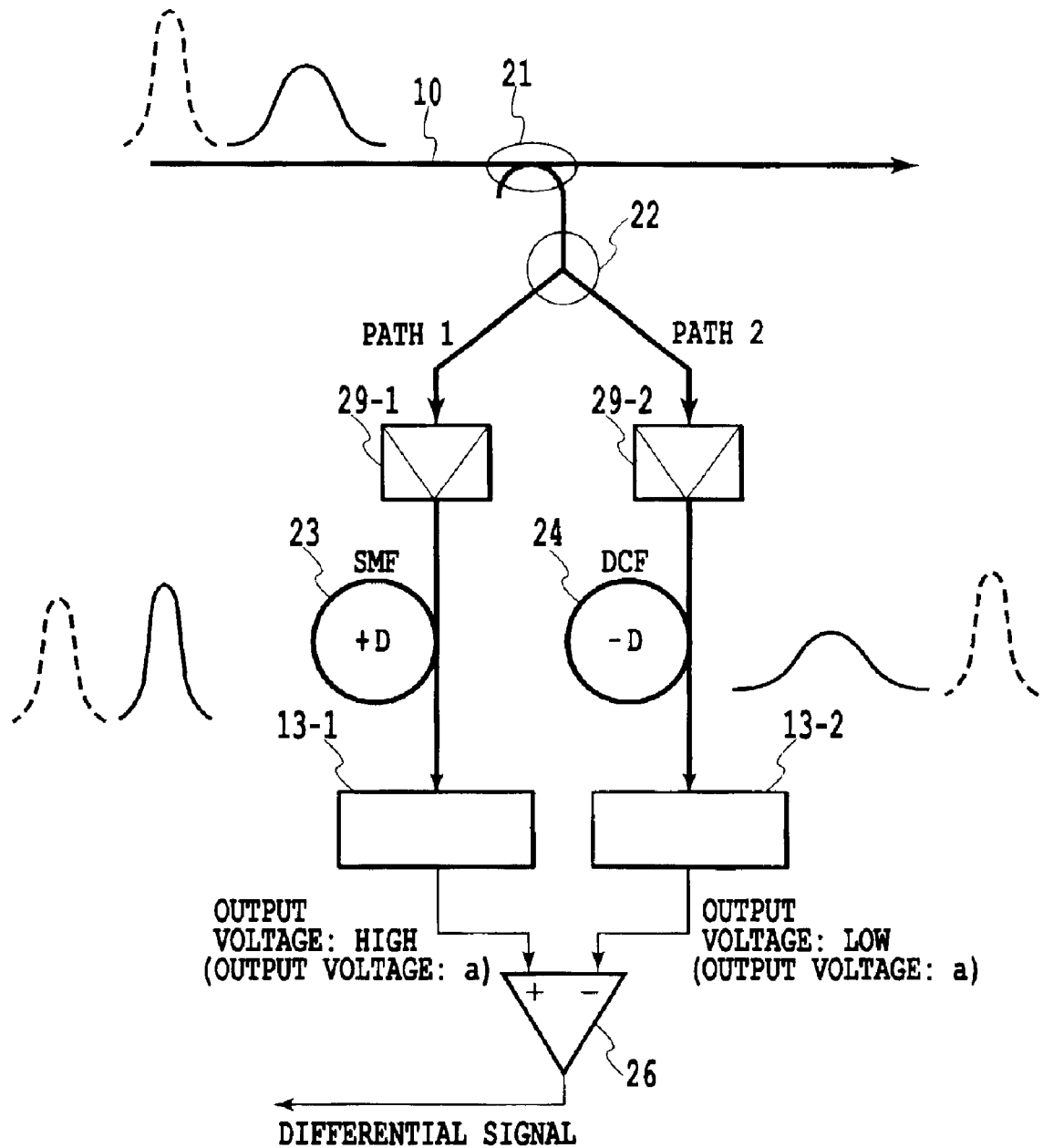
FIG. 8 is a block diagram showing a fifth configuration of the chirp measurement apparatus in accordance with the present invention.

FIG. 8 is a block diagram showing a fifth configuration of the chirp measurement apparatus in accordance with the present invention. It is assumed in the foregoing configurations that the signal light is split to the two equal paths in terms of power by the 50:50 optical coupler 22. In contrast, the present configuration is an example that can cope with a case where the input signal light is split into two unequal paths in terms of power, or into two paths having different losses.

The configuration has optical amplifiers 29-1 and 29-2 disposed before the single mode fiber (SMF) 23 and dispersion compensating fiber (DCF) 24 in the two paths. When the input signal light unaffected by the dispersion of the optical fiber transmission line 10 (waveforms indicated by broken lines in FIG. 8) is input, the optical amplifiers 29-1 and 29-2 regulate the optical signal intensities so that the intensities of the electric signals supplied from the two paths to the differential amplifier 26 become equal. This makes it possible to adjust the intensities even if the input light is not divided into two equal portions to the two paths, or the two paths have different losses.

When using an erbium doped fiber amplifier (EDFA) for the optical amplifiers 29-1 and 29-2, for example, their optical signal intensities are controllable by the bias voltages. In addition, the optical amplifiers 29-1 and 29-2 can carry out the APC (Automatic Power Control) such that the average input power to the nonlinear photo-detectors 13-1 and 13-2 become constant. When the splitting ratio to and the losses of the two paths are each equal, the optical amplifiers 29-1 and 29-2 of the two paths are unnecessary. In this case, an optical amplifier (EDFA) can be placed before the 50:50 optical coupler 22 in order to make the average input power to the nonlinear photo-detectors 13-1 and 13-2 constant.

It is also possible for at least one of the optical amplifiers 29-1 and 29-2 to include an additional variable optical attenuator, or to be replaced by a variable optical attenuator to control the optical power of the two paths.

The configuration is designed such that the splitting ratio to and the losses of the two optical paths are compensated for in advance before detecting the magnitude of the dispersion of the optical fiber transmission line 10. In other words, the optical amplifiers 29-1 and 29-2 control the intensities of the optical signals such that the intensities of the electric signals supplied from the two paths to the differential amplifier 26 become equal when the input signal light unaffected by the dispersion is input (broken line waveforms in FIG. 8). Accordingly, it is also possible to use, instead of the optical amplifiers 29-1 and 29-2, electric signal adjusting sections (for example, electric amplifiers) installed at the output side of the nonlinear photo-detectors 13-1 and 13-2 in order to equalize the intensities of the electric signals supplied from the two paths to the differential amplifier 26 by carrying out feedback control of at least one of them by a control circuit 30.

(Sixth Embodiment)

Figure 9:
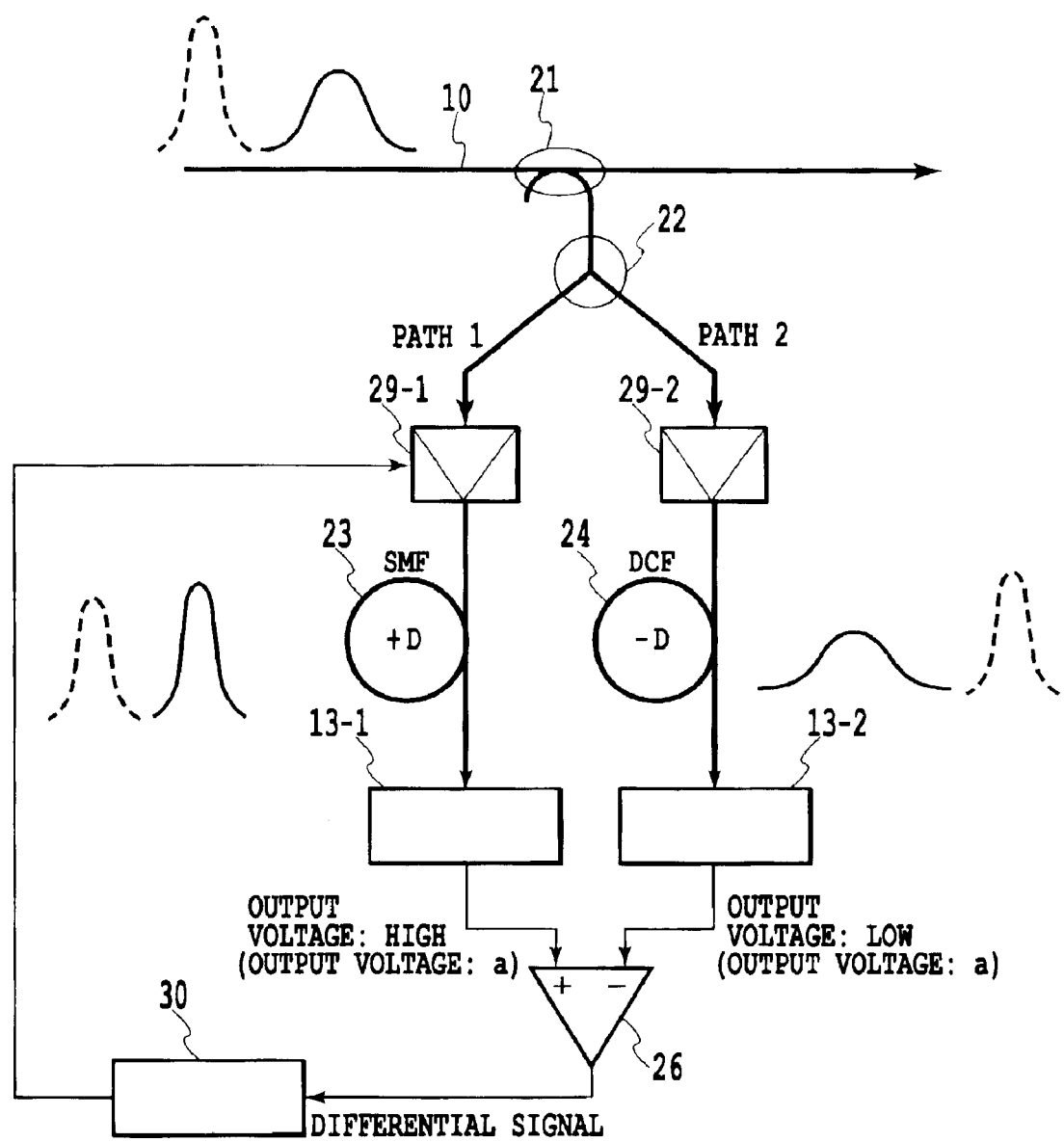
FIG. 9 is a block diagram showing a sixth configuration of the chirp measurement apparatus in accordance with the present invention.

FIG. 9 is a block diagram showing a sixth configuration of the chirp measurement apparatus in accordance with the present invention. The configuration is characterized in that in the fifth configuration, a control circuit 30 feeds the differential signal output from the differential amplifier 26 back to at least one of the optical amplifiers 29-1 and 29-2 of the two paths in order to regulate the differential signal to a minimum (zero) when the input signal light (broken line waveforms in FIG. 9) unaffected by the dispersion of the optical fiber transmission line is input.

It is also possible for at least one of the optical amplifiers 29-1 and 29-2 to include an additional variable optical attenuator, or to be replaced by a variable optical attenuator to control the optical power of the two paths.

The configuration is designed such that the splitting ratio to and the losses of the two optical paths are compensated for in advance before detecting the magnitude of the dispersion of the optical fiber transmission line 10. In other words, the optical amplifiers 29-1 and 29-2 control the intensities of the optical signals such that the intensities of the electric signals supplied from the two paths to the differential amplifier 26 become equal when the input signal light unaffected by the dispersion is input (broken line waveforms in FIG. 9). Accordingly, it is also possible to use, instead of the optical amplifiers 29-1 and 29-2, electric signal adjusting sections (for example, electric amplifiers) installed at the output side of the nonlinear photo-detectors 13-1 and 13-2 in order to equalize the intensities of the electric signals supplied from the two paths to the differential amplifier 26 by carrying out feedback control of at least one of them by the control circuit 30.

(Seventh Embodiment)

Figure 10:
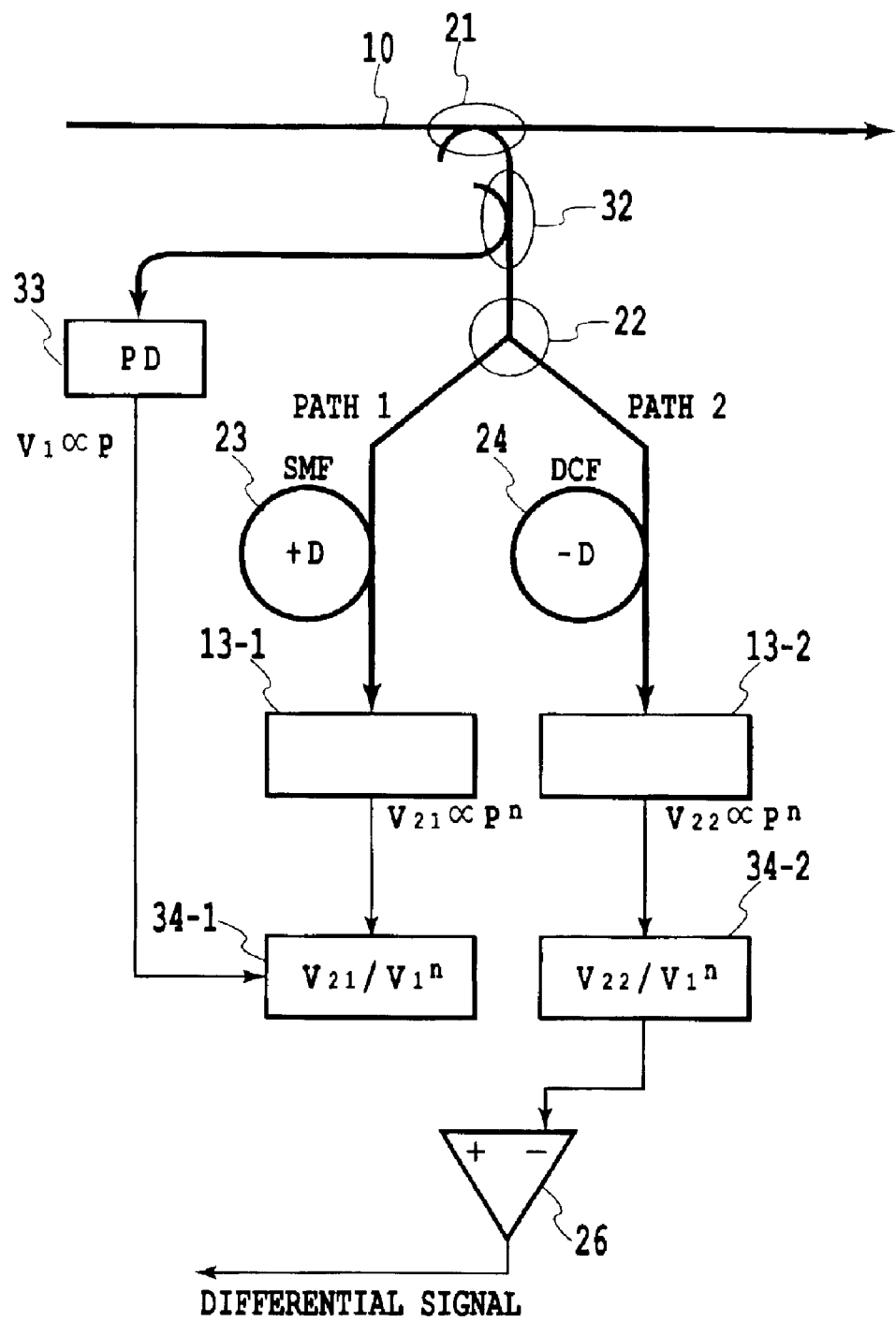
FIG. 10 is a block diagram showing a seventh configuration of the chirp measurement apparatus in accordance with the present invention.

FIG. 10 is a block diagram showing a seventh configuration of the chirp measurement apparatus in accordance with the present invention. The configuration is characterized in that in the first to sixth configurations, an optical coupler 32 is interposed between the 90:10 optical coupler 21 and the 50:50 optical coupler 22 to divide part of the signal light, and a photodiode 33, which is a linear photo-detecting device, is provided to detect it. Assume that the output electric signal is $V_1$. In addition, normalization circuits 34-1 and 34-2 for normalizing the output electric signals $V_{21}$ and $V_{22}$ of the nonlinear photo-detectors 13-1 and 13-2 are provided between the nonlinear photo-detectors 13-1 and 13-2 and the differential amplifier 26. Here, the nonlinear photo-detectors 13-1 and 13-2 output the electric signals $V_{21}$ and $V_{22}$ with the intensities proportional to the nth power of the signal light beams, and the normalization circuits 34-1 and 34-2 output the normalized electric signals $V_{21}/V_1^n$ and $V_{22}/V_1^n$. Accordingly, the differential amplifier 26 outputs the differential signal in which fluctuations of the input optical power are compensated for. Incidentally, when Si-APDs exhibiting the two-photon absorption are used for the nonlinear photo-detecting devices, the value n=2.

Here, the term "normalization" means normalizing the electric signals $V_{21}$ and $V_{22}$ output from the nonlinear photo-detectors 13-1 and 13-2 by the output signal $V_1$ (or the nth power thereof) of the photodiode 33. Thus dividing the part of the signal light to measure and normalize the average optical power makes it possible to measure the desired chirp amount independently of the fluctuations in the optical power passing through the optical fiber transmission line 10.

(Eighth Embodiment)

Figure 11:
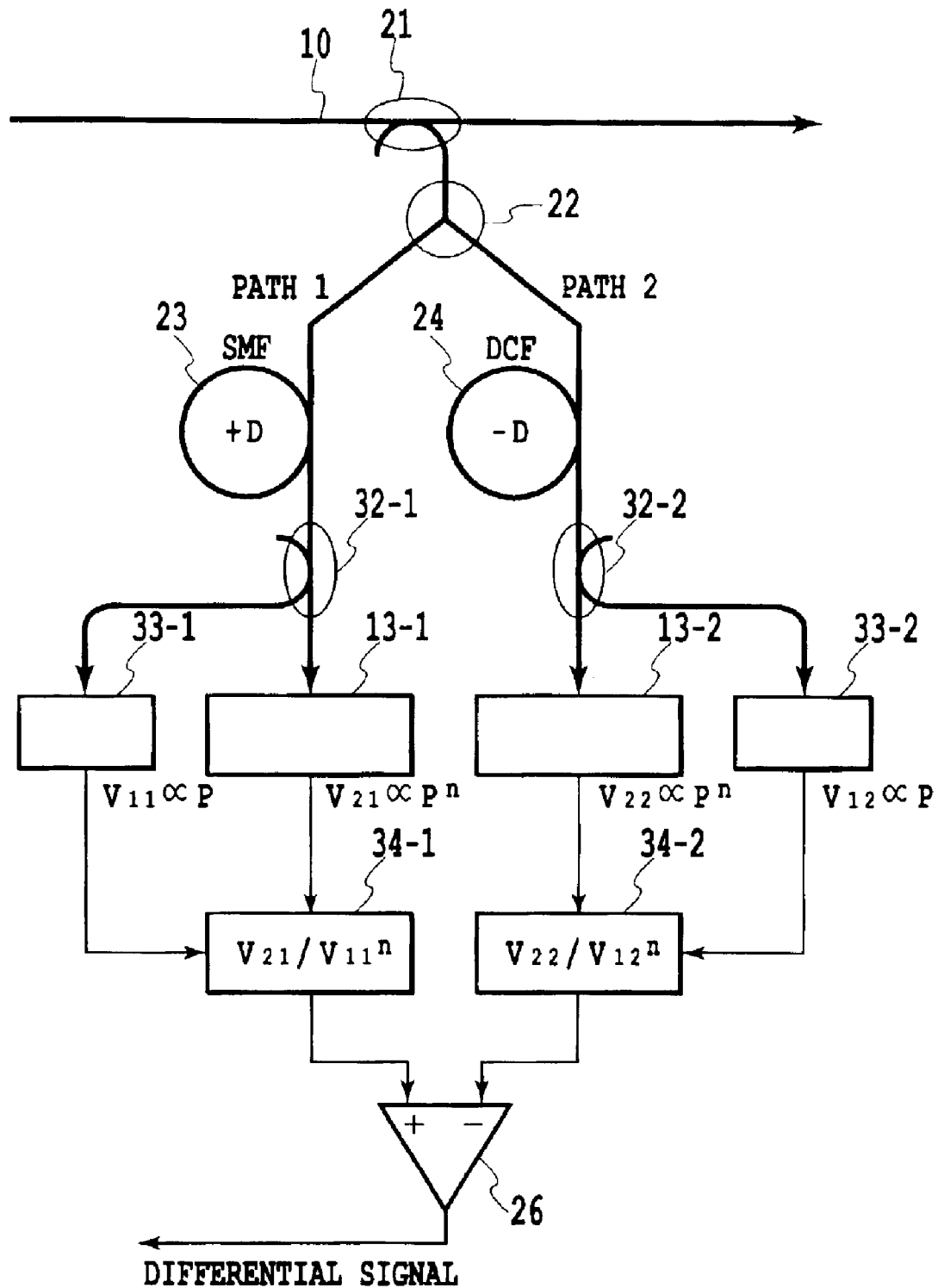
FIG. 11 is a block diagram showing an eighth configuration of the chirp measurement apparatus in accordance with the present invention.

FIG. 11 is a block diagram showing an eighth configuration of the chirp measurement apparatus in accordance with the present invention. The configuration is characterized in that in the first to sixth configurations, optical couplers 32-1 and 32-2 are provided before the nonlinear photo-detectors 13-1 and 13-2 of the two paths to divide parts of the signal light beams, and photodiodes 33-1 and 33-2, which are a linear photo-detecting device, are provided to receive them. Assume that the output electric signals of the photodiodes 33-1 and 33-2 are $V_{11}$ and $V_{12}$. In addition, normalization circuits 34-1 and 34-2 for normalizing the output electric signals $V_{21}$ and $V_{22}$ of the nonlinear photo-detectors 13-1 and 13-2 are provided between the nonlinear photo-detectors 13-1 and 13-2 and the differential amplifier 26. Here, the nonlinear photo-detectors 13-1 and 13-2 output the electric signals $V_{21}$ and $V_{22}$ with the intensities proportional to the nth power of the signal light beams, and the normalization circuits 34-1 and 34-2 output the normalized electric signals $V_{21}/V_{11}^n$ and $V_{22}/V_{12}^n$. Accordingly, the differential amplifier 26 outputs the differential signal in which fluctuations of the input optical power are compensated for.

Here, the term "normalization" means normalizing the electric signals $V_{21}$ and $V_{22}$ output from the nonlinear photo-detectors 13-1 and 13-2 by the output signals $V_{11}$ and $V_{12}$ (or the nth power thereof) of the photodiodes 33-1 and 33-2. Thus dividing the parts of the input light by the optical couplers 32-1 and 32-2, and normalizing them by the optical powers of the light beams input to the individual optical couplers 32-1 and 32-2 makes it possible to measure the desired chirp amount independently of the fluctuations in the optical power passing through the optical fiber transmission line 10.

(Ninth Embodiment)

Figure 12:
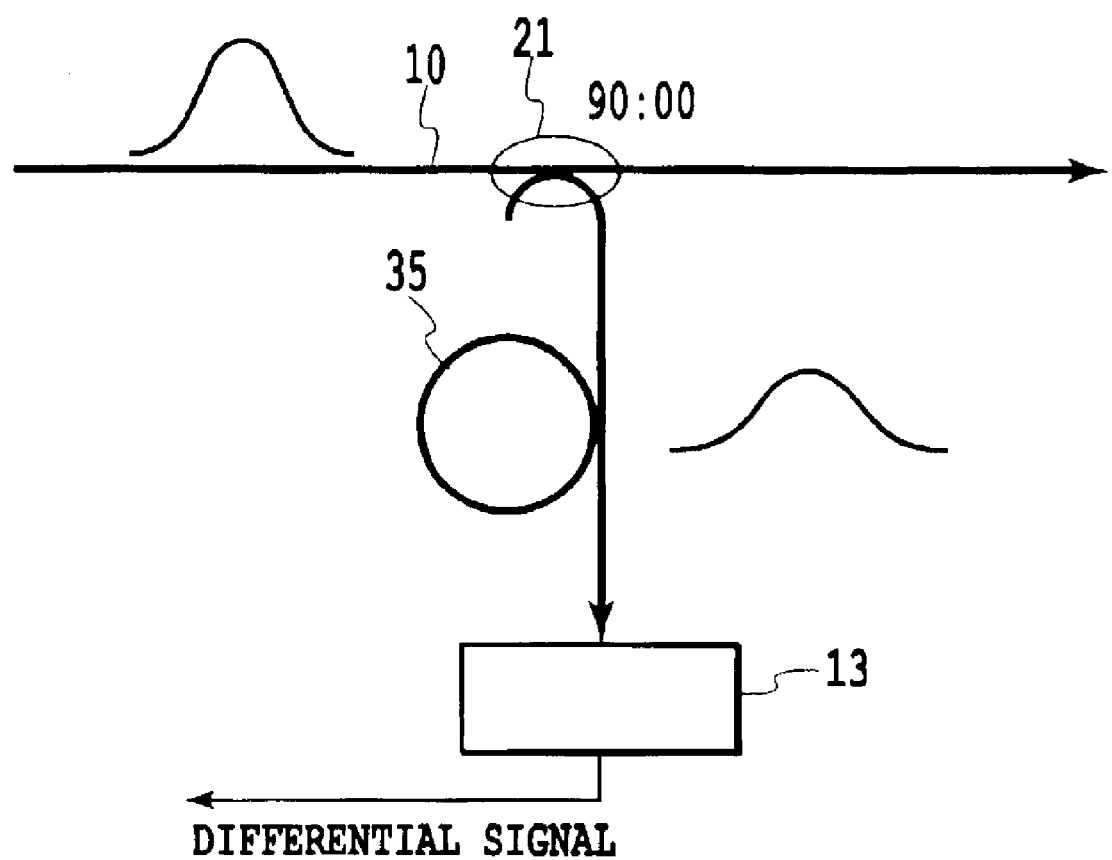
FIG. 12 is a block diagram showing a ninth configuration of the chirp measurement apparatus in accordance with the present invention.

FIG. 12 is a block diagram showing a ninth configuration of the chirp measurement apparatus in accordance with the present invention. In FIG. 12, the input signal light traveling through the optical fiber transmission line 10 undergoes 1/10 power division by the 90:10 optical coupler 21. The bypath includes an optical fiber 35 with the total dispersion amount of D ($\neq 0$) at the used wavelength. In addition, a nonlinear photo-detector 13 is provided which outputs an electric signal with the intensity proportional to the nth power of the input optical intensity of the signal passing through the light optical fiber 35.

Since the output voltage of the nonlinear photo-detector 13 takes different values depending on the magnitude of the dispersion (chirp), it can be used as the dispersion detection signal of the optical fiber transmission line 10. More specifically, it is possible to measure the chirp by storing in a processing unit (not shown) a cross-reference table that gives chirp values for the output voltage of the nonlinear photo-detector 13, which are measured in advance, and by referring to the cross-reference table by the output voltage varying depending on the magnitude of the chirp.

(Tenth Embodiment)

Figure 13:
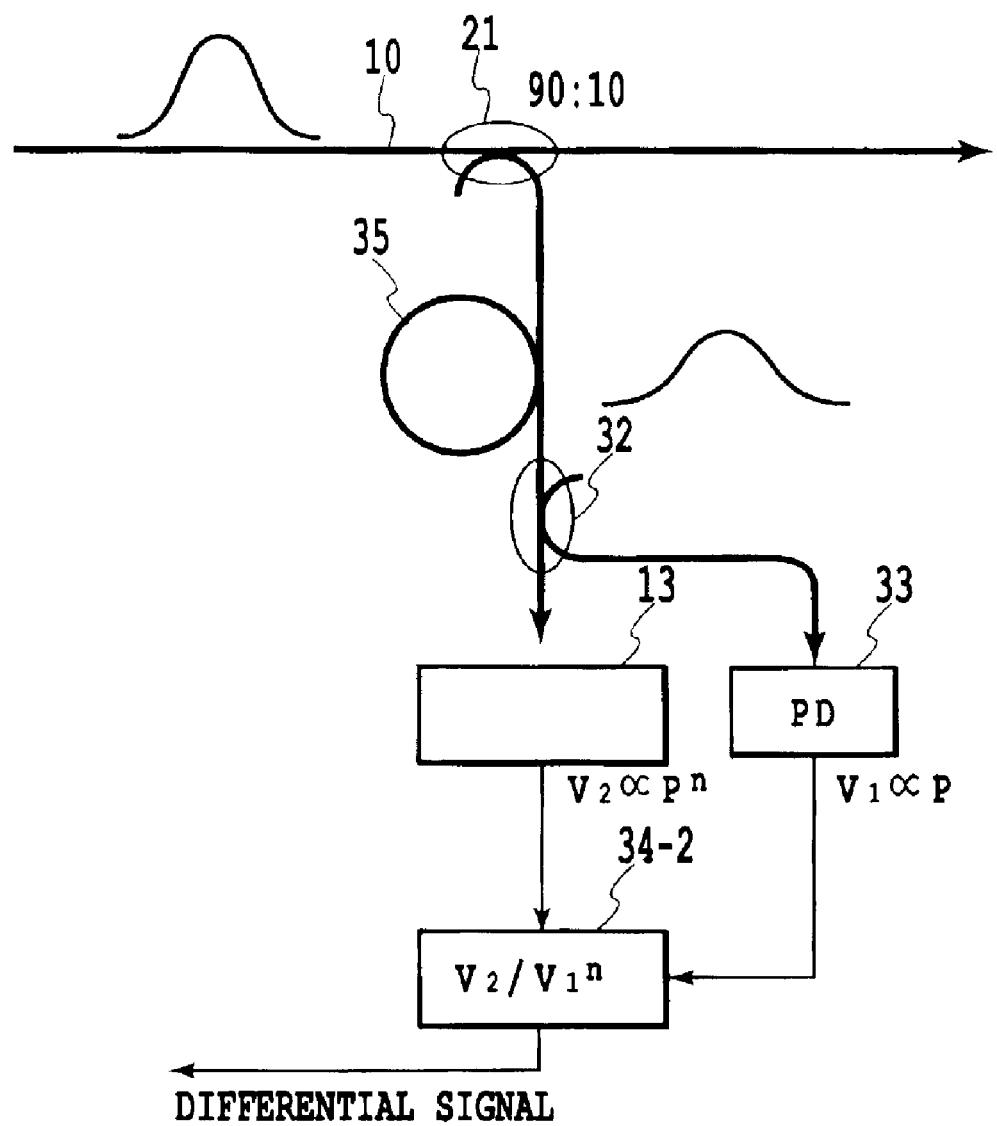
FIG. 13 is a block diagram showing a tenth configuration of the chirp measurement apparatus in accordance with the present invention.

FIG. 13 is a block diagram showing a tenth configuration of the chirp measurement apparatus in accordance with the present invention. The configuration is characterized in that in the ninth configuration, an optical coupler 32 is provided before the nonlinear photo-detector 13 to divide part of the input light, and a photodiode 33 which is a linear photo-detecting device detects it. Assume that the electric signal output from the photodiode 33 is $V_1$. In addition, a normalization circuit 34 is provided at the output of the nonlinear photo-detector 13 to normalize its output electric signal $V_2$. The normalization circuit 34 outputs the normalized electric signal $V_2/V_1^n$, in which the fluctuations of the input optical power is compensated for.

Since the output electric signal of the normalization circuit 34 takes different values depending on the magnitude of the dispersion (chirp), it is possible to measure the chirp by storing in the processing unit (not shown) the cross-reference table that gives chirp values for the output electric signal of the normalization circuit 34, which are measured in advance, and by referring to the cross-reference table by the output voltage varying depending on the magnitude of the chirp.

(Eleventh Embodiment)

Figure 14:
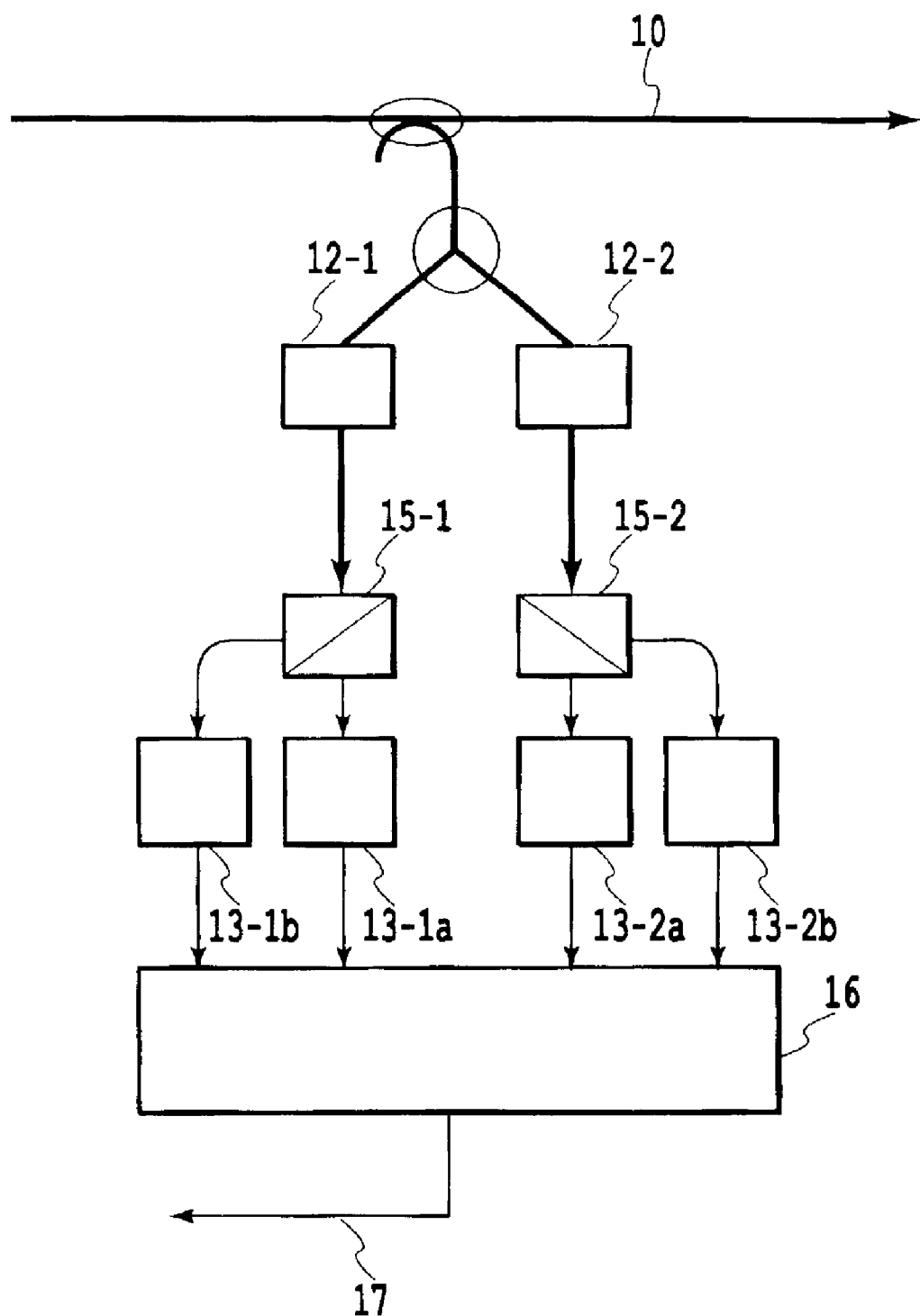
FIG. 14 is a block diagram showing an 11th configuration of the chirp measurement apparatus in accordance with the present invention.

FIG. 14 is a block diagram showing an 11th configuration of the chirp measurement apparatus in accordance with the present invention. The configuration is characterized in that polarization beam splitters 15-1 and 15-2 are provided after the dispersion media 12-1 and 12-2 to split the optical signals fed from the dispersion media 12-1 and 12-2 to polarized waves orthogonal to each other. The split polarized waves are supplied to the nonlinear photo-detectors 13-1a and 13-1b and 13-2a and 13-2b that are installed for the individual polarized waves so that they output the electric signals (voltages) with the intensities proportional to the nth power of the optical intensities of the individual signal light beams, where n>1. The electric signals are supplied to a processing unit 16.

Since the electric signals supplied to the processing unit 16 take different values depending on the magnitude of the dispersion (chirp) of the individual polarized waves, it is possible to measure the chirp and output the measurement result as the chirp signal 17 by storing in the processing unit 16 the cross-reference table that gives chirp values for the output electric signals, which are measured in advance, and by referring to the cross-reference table by the output voltage varying depending on the magnitude of the chirp.

(Configurations of Dispersion Compensating Apparatus)

The dispersion compensating apparatus described in the present embodiment is characterized in that it uses the chirp measurement apparatus in accordance with the present invention, measures the chirp of the optical signal output from the optical fiber transmission line, and controls the tunable dispersion equalizer such that the chirp is canceled out.

Figure 15:
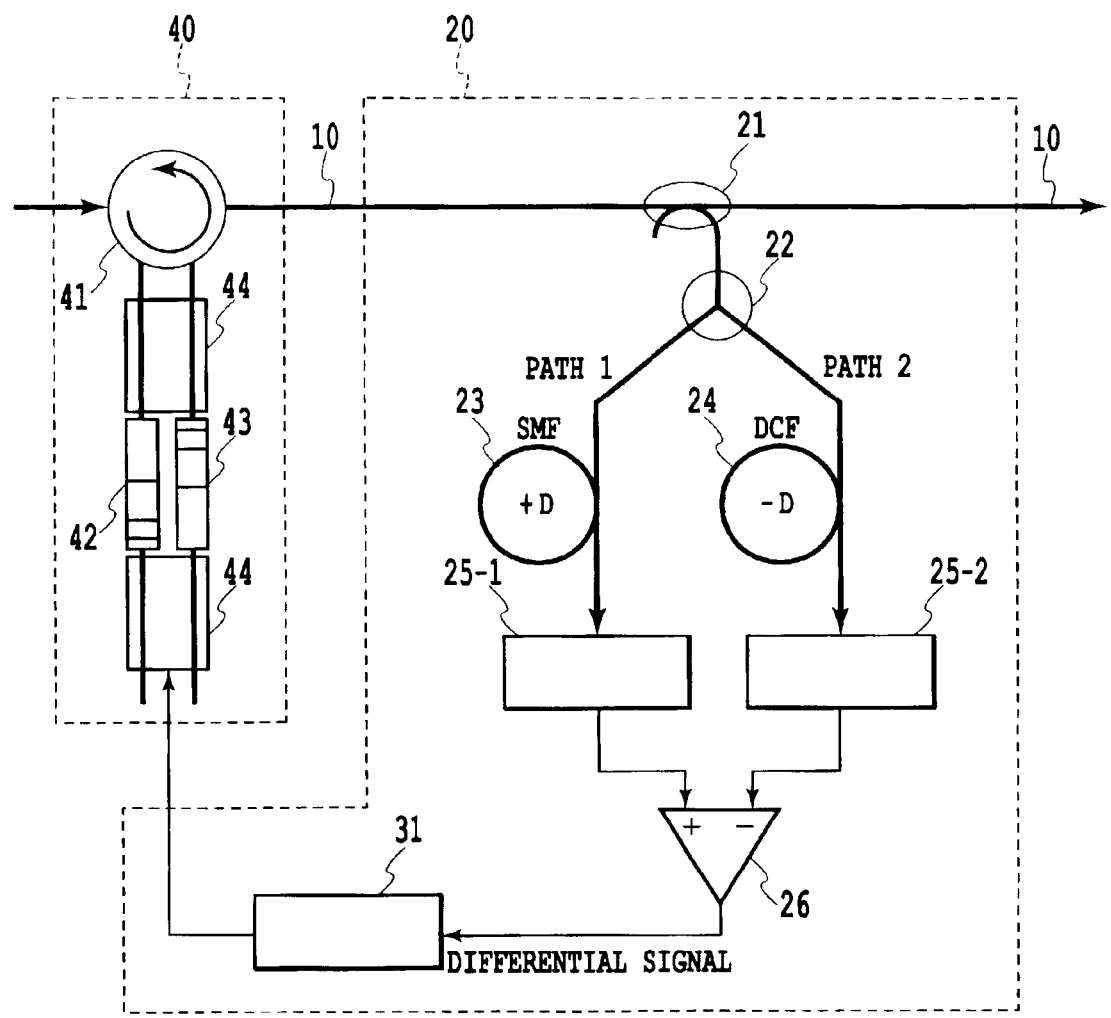
FIG. 15 is a block diagram showing a configuration of a dispersion compensating apparatus in accordance with the present invention.

FIG. 15 is a block diagram showing a configuration of the dispersion compensating apparatus in accordance with the present invention. In FIG. 15, the dispersion compensating apparatus comprises a tunable dispersion equalizer 40 and the chirp measurement apparatus 20 in accordance with the present invention. The chirp measurement apparatus 20 feeds the differential signal output from the differential amplifier 26 back to the tunable dispersion equalizer 40 via a control circuit 31.

Although the chirp measurement apparatus 20 of FIG. 15 is that of the first configuration, it is obvious that other chirp measurement apparatuses described in the other embodiments are also applicable.

Figure 16A:
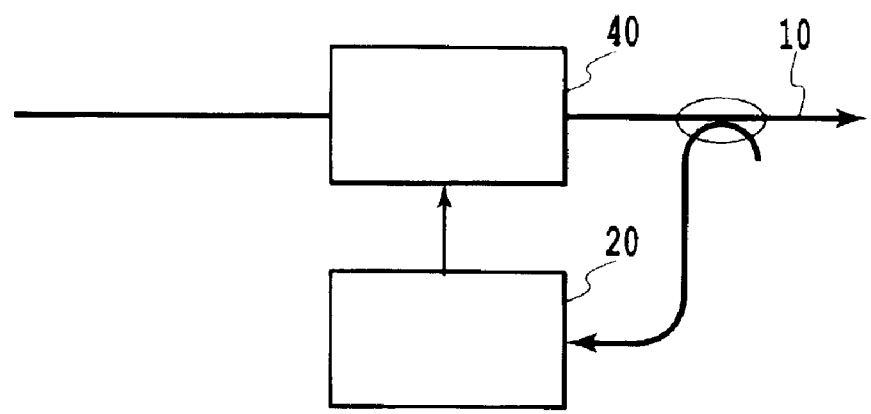
FIGS. 16A and 16B are block diagrams showing positional relationships between the chirp measurement apparatus and tunable dispersion equalizer on the optical fiber transmission line in the dispersion compensating apparatus in accordance with the present invention.
Figure 16B:
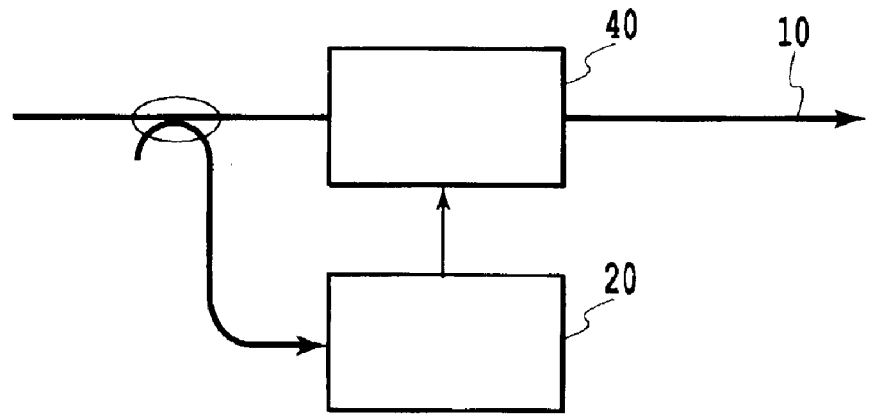

In addition, as for the positional relationship between the chirp measurement apparatus 20 and the tunable dispersion equalizer 40 on the optical fiber transmission line, although the chirp measurement apparatus 20 is placed after the tunable dispersion equalizer 40 as shown in FIG. 15 (see also FIG. 16A), the chirp measurement apparatus 20 can be placed before the tunable dispersion equalizer 40 as in the configuration of FIG. 16B, offering the same advantages.

The configuration as shown in FIG. 15 employs a nonlinear chirped fiber Bragg gratings paired type tunable dispersion equalizer as the tunable dispersion equalizer 40. In the configuration, the second port of the four-port optical circulator 41 is connected to the longer wavelength side of a chirp fiber grating 42. In addition, the third port of the four-port optical circulator 41 is connected to the shorter wavelength side of a chirp fiber grating 43. Furthermore, the first port of the four-port optical circulator 41 is used as the input port connected to the optical fiber transmission line 10, and the fourth port is used as the output port. The tuning section of the tunable dispersion equalizer 40 has a structure in which the two chirped fiber Bragg gratings 42 and 43 are fixed to piezoelectric transducers 44 adhesively. Applying a voltage to the piezoelectric transducers to control expansion and contraction from the both sides enables the reflected wavelength bands of the individual chirped fiber Bragg gratings 42 and 43 to be shifted in the same direction, thereby being able to alter the wavelength dispersion characteristics for the transmitting light.

It is assumed that the dispersion value variable range of the tunable dispersion equalizer 40 is −16 ps/nm∼+16 ps/nm at the wavelength of the signal light, for example. In addition, assume that the dispersion value of the single mode fiber (SMF) 23 of the chirp measurement apparatus 20 is +16 ps/nm at the wavelength of the signal light, and that of the dispersion compensating fiber (DCF) 24 is −16 ps/nm at the wavelength of the signal light. When the optical signal pulse from the optical fiber transmission line 10 is affected by the dispersion, the output voltages of the Si-APDs 25-1 and 25-2 of the two paths exhibit the difference corresponding to the dispersion (chirp).

Figure 1:
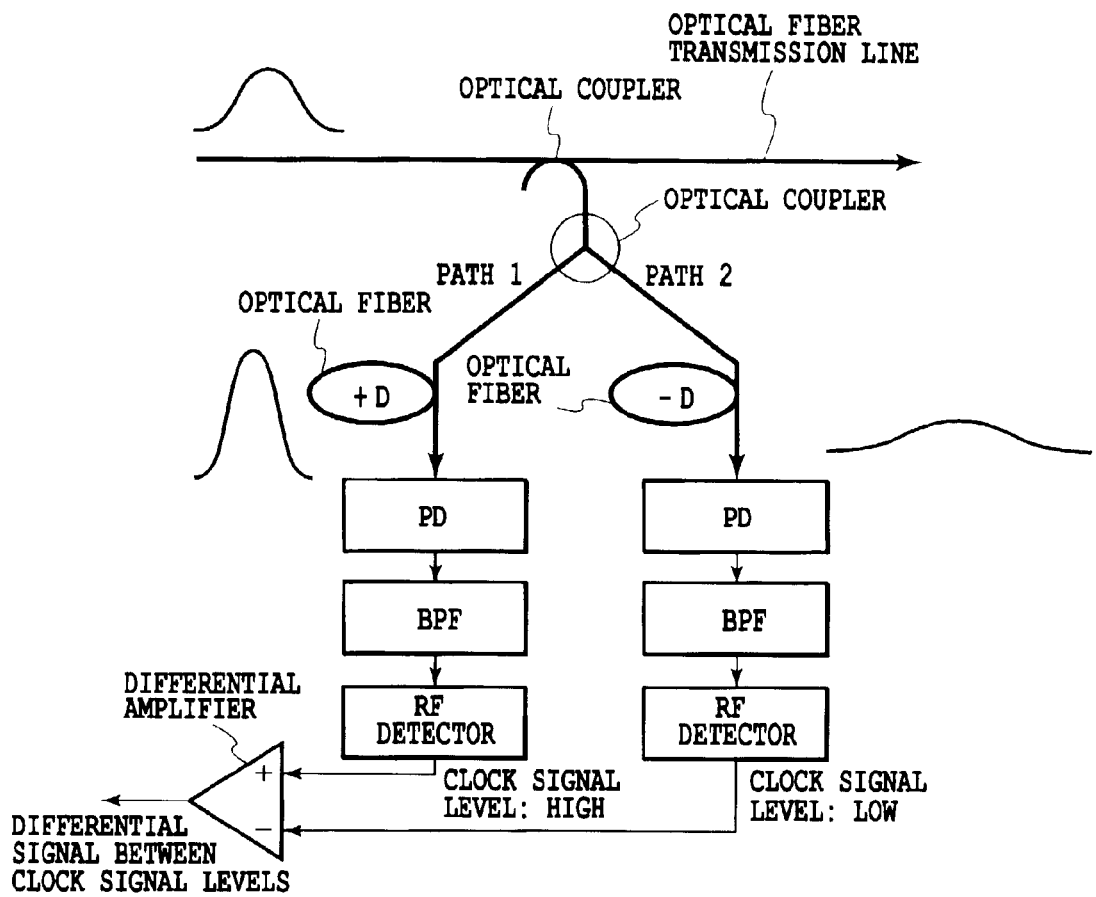
FIG. 1 is a block diagram showing a configuration of a conventional dispersion detection apparatus.
Figure 2:
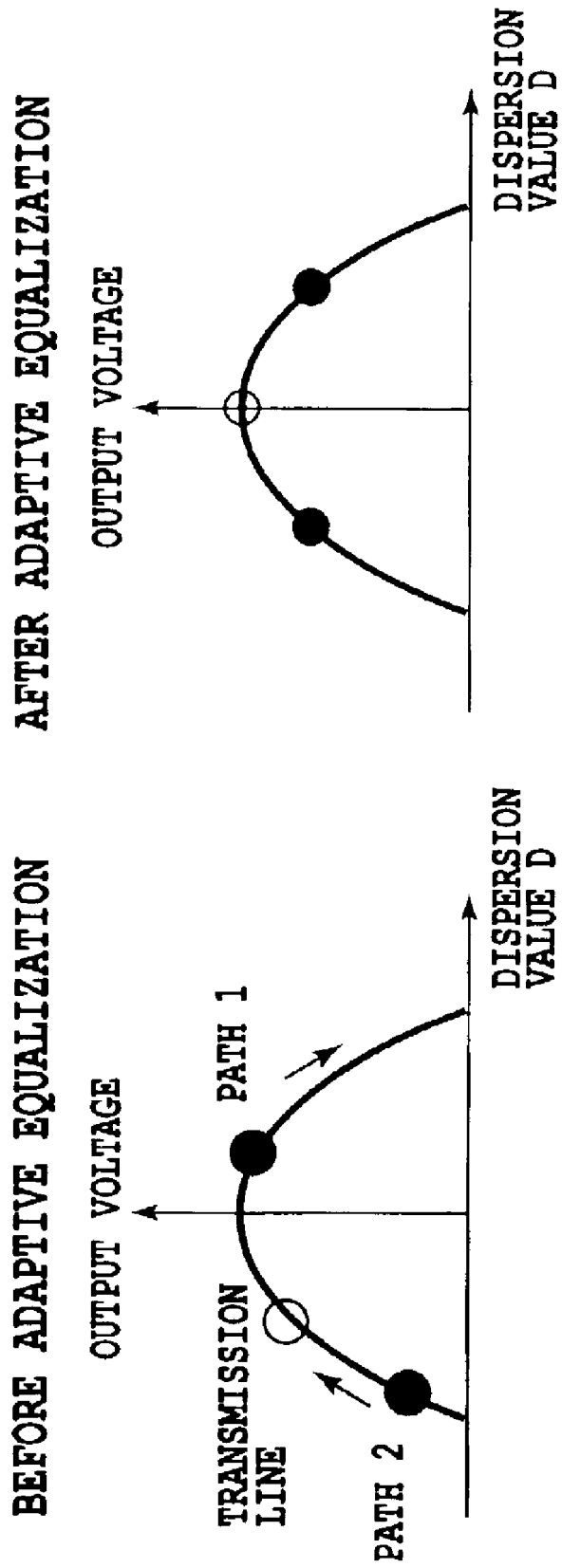
Figure 17:
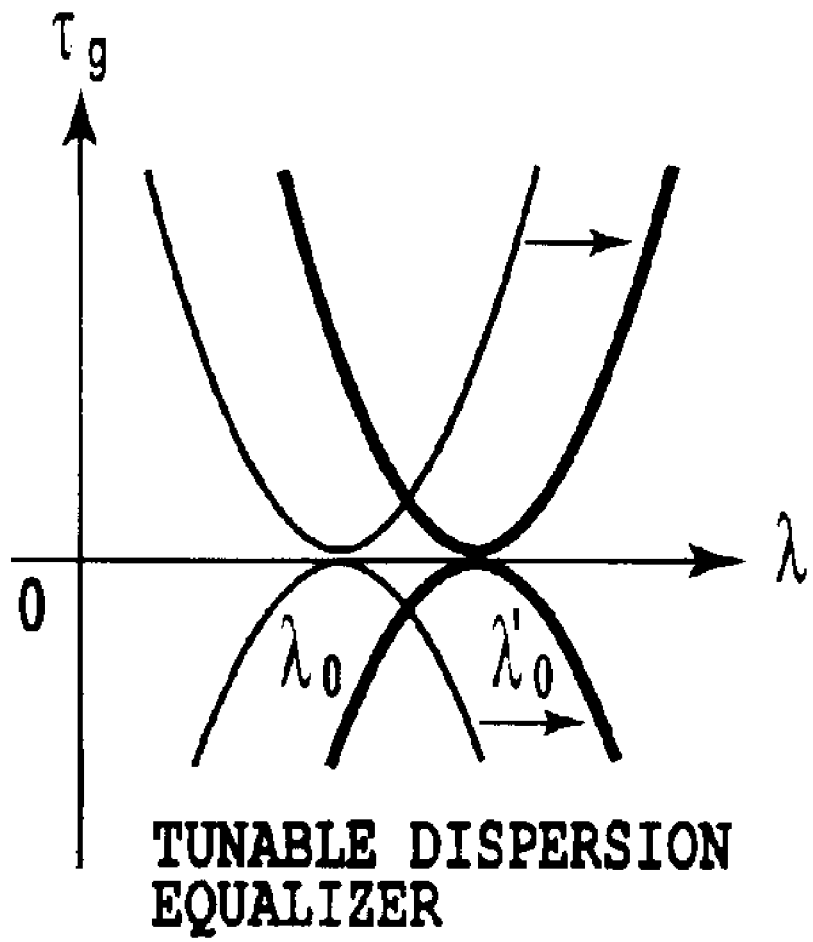
FIG. 17 is a graph illustrating an adaptive dispersion equalization method using the chirp measurement apparatus in accordance with the present invention.

When the optical signal pulse is affected by the negative dispersion on the optical fiber transmission line 10, the paths 1 and 2 undergo the following influence before the adaptive equalization as illustrated in FIG. 2A. In the path 1, the pulse width narrows and the peak power increases because of the small effect of the dispersion. In contrast with this, in the path 2, the pulse width broadens and the peak power reduces because of the large effect of the dispersion. Accordingly, the output voltage of the Si-APD 25-1 of the path 1 is high, and the output voltage of the Si-APD 25-2 of the path 2 is low. The differential amplifier 26 outputs the differential signal corresponding to the difference between the output voltages. The differential signal is supplied to control circuit 31 comprising a proportional circuit and an integral circuit. The control circuit 31 converts the differential signal to a driving signal for controlling the piezoelectric transducers 44 of the tunable dispersion equalizer 40. The control circuit 31 controls the expansion and contraction of the chirp fiber gratings 42 and 43 such that the differential signal becomes zero. Thus, the zero dispersion wavelength of the tunable dispersion equalizer 40 shifts following the dispersion fluctuations in the optical fiber transmission line 10 as illustrated in FIG. 17, thereby enabling the adaptive dispersion equalization (FIG. 2B).

As described above, the chirp measurement apparatus 20 in accordance with the present invention utilizes the two-photon absorption effect rather than the clock extraction method to obtain the differential signal. As a result, it is applicable to 10 Gbit/s∼40 Gbit/s optical transmission systems, for example, and even to 160 Gbit/s optical transmission system independently of the bit rate of the transmission system.

(Twelfth Embodiment)

Figure 18:
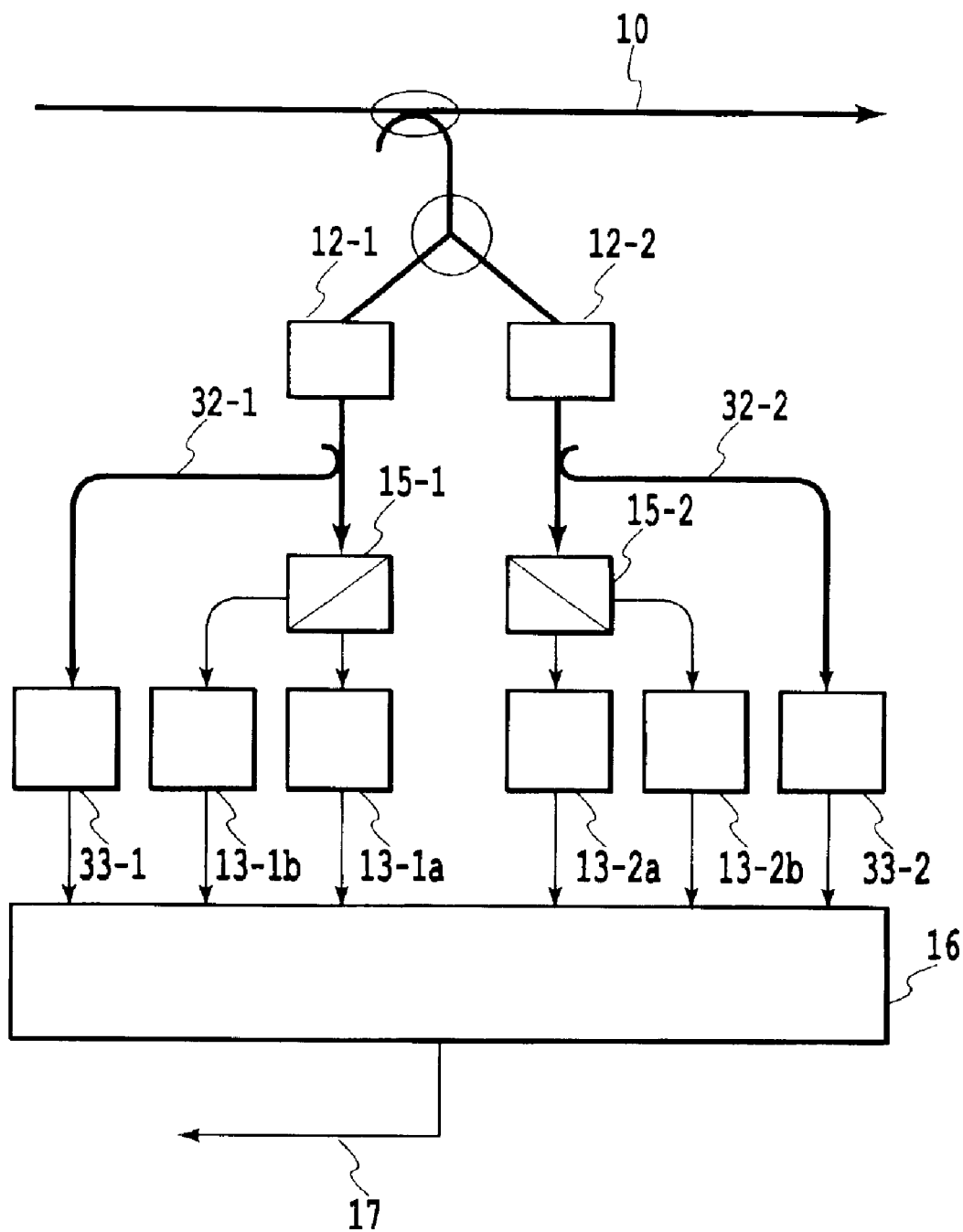
FIG. 18 is a block diagram showing a 12th configuration of the chirp measurement apparatus in accordance with the present invention.

FIG. 18 is a blockdiagram showing a twelfth configration of the chirp measurement apparatus in accordance with the present invention. The twelfth configuration is characterized in that in the eleventh configration, optical couplers 32-1 and 32-2 are provided before the polarization beam splitters 15-1 and 15-2 followed by the nonlinear photo-detectors 13-1$a$ and 13-1$b$ and 13-2$a$ and 13-2$b$ of the two paths to divide parts of the signal light beams, and photodiodes 33-1 and 33-2 which are linear photo-detecting devices provided to receive them. The electric signals output from the linear photo-detecting devices are supplied to a processing unit 16.

Since the electric signals supplied to the processing unit 16 are normalized and take different values depending on the magnitude of the dispersion (chirp) of the individual polarized waves, it is possible to measure the chirp and output the measurement result as the chirp signal 17 by storing in the processing unit 16 the cross-reference table that gives chirp values for the output electric signals, which are measured in advance, and by referring to the cross-reference table by the output voltage varying depending on the magnitude of the chirp.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A chirp measurement apparatus comprising:
    a dispersion medium with a total dispersion amount of +D (≠0) at the wavelength of an input signal light;
    linear photo-detecting means for receiving a divided part of the signal light passing through said dispersion medium, and for outputting an electric signal $V_1$ with intensity proportional to the optical intensity of the received part of the divided signal light;
    nonlinear photo-detecting means for receiving the other part of divided input signal light for outputting an electric signal $V_2$ with intensity proportional to nth power of the optical intensity of the received other part of divided input signal light; and
    normalization means for normalizing the electric signal $V_2$ output from said nonlinear photo-detecting means to an electric signal $V_2/V_1^n$ by the electric signal $V_1$, and for outputting the electric signal $V_2/V_1^n$ as a chirp signal of the input signal light.

2. A dispersion compensating apparatus comprising the chirp measurement apparatus as defined in claim 1, and tunable dispersion equalization means for canceling the chirp of the input signal light measured by said chirp measurement apparatus.

* * * * *